United States Patent
James

(10) Patent No.: US 9,174,150 B2
(45) Date of Patent: *Nov. 3, 2015

(54) FLOAT DEVICE

(71) Applicant: Fuel Active Limited, Taffs Well (GB)

(72) Inventor: Michael John James, Cardiff (GB)

(73) Assignee: Fuel Active Limited

( * ) Notice: Subject to any disclaimer, the term of this patent is extended or adjusted under 35 U.S.C. 154(b) by 0 days.

This patent is subject to a terminal disclaimer.

(21) Appl. No.: 14/263,246

(22) Filed: Apr. 28, 2014

(65) Prior Publication Data

US 2014/0230904 A1 Aug. 21, 2014

Related U.S. Application Data

(63) Continuation of application No. 12/346,038, filed on Dec. 30, 2008, now Pat. No. 8,707,991.

(51) Int. Cl.
| | | |
|---|---|---|
| *B01D 35/05* | (2006.01) | |
| *E04H 4/12* | (2006.01) | |
| *B60K 15/06* | (2006.01) | |
| *B60K 15/077* | (2006.01) | |
| *B60K 15/03* | (2006.01) | |

(52) U.S. Cl.
CPC .............. *B01D 35/05* (2013.01); *B60K 15/061* (2013.01); *B60K 15/077* (2013.01); *E04H 4/1263* (2013.01); *B60K 2015/03236* (2013.01); *B60K 2015/03473* (2013.01); *B60K 2015/0772* (2013.01); *Y10T 137/0318* (2015.04); *Y10T 137/7323* (2015.04); *Y10T 137/86212* (2015.04); *Y10T 137/86252* (2015.04); *Y10T 137/86348* (2015.04)

(58) Field of Classification Search
CPC ........... B01D 35/05; B60K 2015/0772; E04H 4/1263; Y10T 137/86348; Y10T 137/86212; Y10T 137/86252
USPC .......... 137/578, 574, 590; 210/167.2, 170.05, 210/242.1
See application file for complete search history.

(56) References Cited

U.S. PATENT DOCUMENTS

| | | |
|---|---|---|
| 1,591,923 A | 7/1926 | Lebherz |
| 1,647,808 A | 11/1927 | August |
| 2,010,363 A | 8/1935 | Hine |
| 2,427,102 A | 9/1947 | Hale |
| 4,179,379 A | 12/1979 | Mitchell |

(Continued)

FOREIGN PATENT DOCUMENTS

| | | |
|---|---|---|
| DE | 4339684 | 5/1995 |
| GB | 2350337 | 11/2000 |

(Continued)

*Primary Examiner* — Atif Chaudry
(74) *Attorney, Agent, or Firm* — Gordon & Jacobson, P.C.

(57) ABSTRACT

A float device for use in drawing liquids such as fuel from a tank or other reservoir is disclosed. The device comprises a float arranged for rising and falling with the level of liquid in the tank and a liquid pick-up duct, which comprises a flexible tube having its free end coupled to the float. The float is arranged for vertical movement within a filter or other member, which encloses the float and the flexible tube. The filter or other member is elongate and tubular in construction and comprises an open lower end.

19 Claims, 1 Drawing Sheet

(56) References Cited

U.S. PATENT DOCUMENTS

| | | |
|---|---|---|
| 4,270,505 A | 6/1981 | Johnson |
| 4,313,233 A | 2/1982 | Roberts |
| 4,626,347 A | 12/1986 | Neglio |
| 4,663,037 A | 5/1987 | Breslin |
| 5,657,909 A | 8/1997 | Barriac |
| 8,707,991 B2 * | 4/2014 | James ................... 137/578 |
| 2002/0064090 A1 | 5/2002 | Su |

FOREIGN PATENT DOCUMENTS

| | | |
|---|---|---|
| GB | 2446011 | 7/2008 |
| JP | 56159558 | 12/1981 |
| JP | 07319552 | 12/1995 |
| KR | 200192497 | 10/2001 |
| SU | 1153948 | 5/1985 |

* cited by examiner

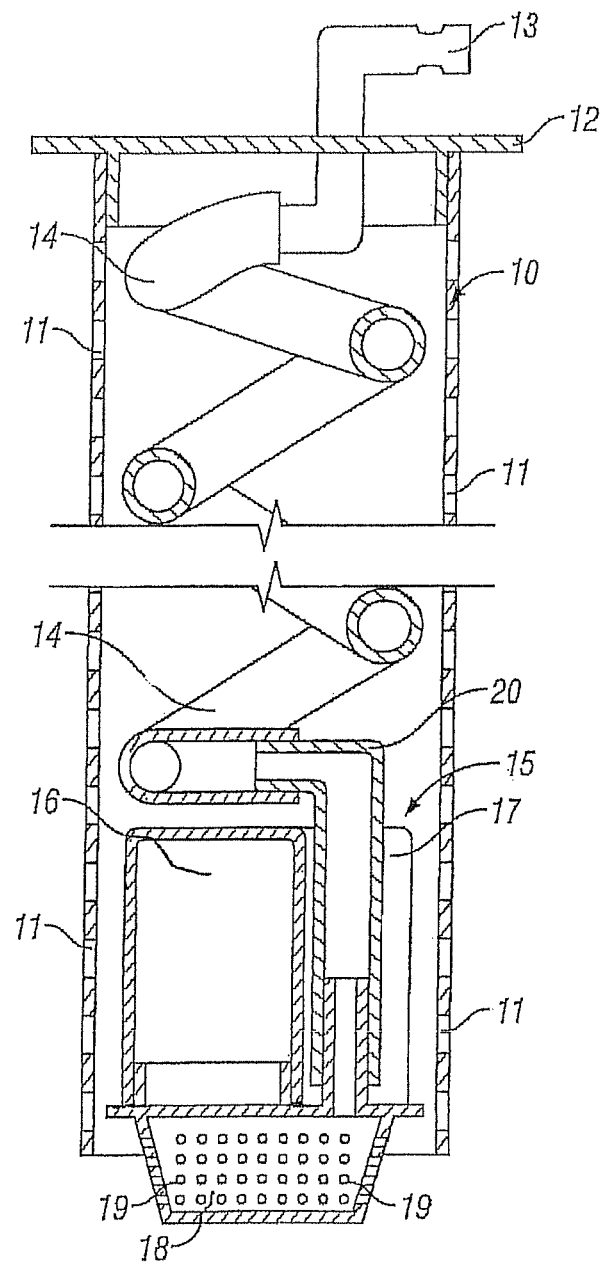

FLOAT DEVICE

CROSS-REFERENCE TO RELATED APPLICATIONS

The present application is a continuation of U.S. application Ser. No. 12/346,038, filed on Dec. 30, 2008, now U.S. Pat. No. 8,707,991.

BACKGROUND OF THE INVENTION

1. Field of the Invention

This invention relates to a float device for use in drawing liquids such as fuel from a tank or other reservoir.

2. Related Art

In conventional fuel tanks, the fuel is drawn from a point adjacent the bottom of the tank in order to enable the pick-up of fuel even when the level of fuel in the tank is low. However, a disadvantage of this arrangement is that any water and/or sediment which has accumulated at the bottom of the tank can be drawn up with the fuel.

UK Patent Number GB2 350 337B discloses a solution to this problem in the form of a float device having a float arranged for rising and falling with the level of fuel in the tank, and a fuel pick up duct which comprises a flexible tube having its free end coupled to the float, the float being arranged for vertical movement within a filter which encloses the float and the flexible tube.

In use, the float ensures that the fuel entry or pick-up end of the tube is always adjacent the surface of the fuel in the tank. Accordingly, the pick-up point is always adjacent the surface of the fuel in the tank and thus the risk of drawing up a sediment or water is alleviated.

The filter in which the float moves vertically comprises an elongate perforated tube which is closed at its lower end by a solid or perforated end wall. A disadvantage of this arrangement is that the length of the filter needs to be accurate, otherwise it will abut the bottom of the tank and prevent the device from fitting properly. Alternatively, if the filter is too short, the pick-up end of the tube will not reach to the bottom of the tank and as such the fuel capacity of the tank is not maximised.

SUMMARY OF THE INVENTION

I have now devised a float device which alleviates the above-mentioned problems.

In accordance with the present invention, as seen from a first aspect, there is provided a float device for use in drawing liquids such as fuel from a tank or other reservoir, the device comprising a float arranged for rising and falling with the level of liquid in the tank, and a liquid pick-up duct which comprises a flexible tube having its free end coupled to the float, the float being arranged for vertical movement within a filter or other member which encloses the float and the flexible tube, wherein the filter or other member is elongate and tubular in construction and comprises an open the lower end.

In use, the device operates in the same manner as the float device of UK Patent Number GB2 350 337B. However, the lower end of the filter or other member is open thereby allowing the float to extend partially below the filter or other member when the level of fuel in the tank is low. In this way a device with a slightly shorter filter or other member can be fitted into a tank to ensure that the device fits and to allow for manufacturing tolerances or deformations in the tank. However, when the level of fuel is low, the float extends below the level of the filter or other member so that more fuel can be drawn from the tank compared with the device disclosed in UK Patent Number GB2 350 337B. It will be appreciated that a device having a filter or other member of a particular length can thus be fitted to tanks having a range of different depths.

The end of the tube may be outside the filter or other member when the fuel in tank is low and thus the float preferably carries filter means arranged to filter the liquid being drawn up the tube.

Preferably the float comprises a hollow chamber to which said tube is connected, the chamber comprising an apertured wall forming said filter means.

Preferably the apertured wall forms the bottom wall of the float, so that filtered fuel can be drawn right down to the point where the float buts the bottom of the tank.

Also in accordance with this invention, as seen from a second aspect, there is provided a float device for use in drawing liquids such as fuel from a tank or other reservoir, the device comprising a float arranged for rising and falling with the level of liquid in a reservoir, and a liquid pick-up duct which comprises a flexible tube having its free end coupled to the float, the float being arranged for vertical movement within an enclosure which encloses the float and the flexible tube, wherein the float carries filter means arranged to filter liquid being drawn up the tube.

Preferably the float comprises a hollow chamber to which said tube is connected, the chamber comprising an apertured wall forming said filter means.

Preferably the apertured wall forms the bottom wall of the float.

Preferably the bottom surface of the float is profiled or comprises projections which prevent the apertured wall from abutting the bottom surface of the tank and thereby inhibiting the flow of liquid.

Additional objects and advantages of the invention will become apparent to those skilled in the art upon reference to the detailed description taken in conjunction with the provided figures.

BRIEF DESCRIPTION OF THE FIGURE

The FIGURE is a sectional view through a float device in accordance with the present invention.

DETAILED DESCRIPTION

An embodiment of the present invention will now be described by way of an example only and with reference to the accompanying drawing.

Referring to the FIGURE, there is shown a float device for fitting to a circular aperture formed in the top wall of a fuel tank (not shown). The device comprises an elongate circular-section of filter in the form of a metal sleeve 10 provided with an array of apertures 11. The sleeve 10 is open at its lower end and closed at its upper end by a flanged end cap 12, which is arranged for securing around its periphery to the edges of the aperture in the fuel tank.

A rigid feed pipe 13 extends through the end cap 12, the lower end of the pipe 13 being connected to an elongate coiled flexible tube 14 of plastics material. The lower end of the flexible tube 14 is connected to a float 15 by means of a tubular connector 20.

The float 15 is generally circular in section and is arranged to freely move vertically within the sleeve 10 with the level of fuel in the tank. The float 15 comprises a sealed upper chamber 16 which is filled with air and a separate bottom chamber 18 having bottom and side walls which are provided with apertures 19. The bottom chamber 18 comprises an outlet duct connected to the flexible tube 14 via the connector 20.

In use, when fitted to a fuel tank, the float 15 floats on the surface of the fuel and fuel is drawn into the lower chamber 18 through the apertures 19 and along the flexible tube 14. The apertures 19 serve to filter the fuel and prevent sediment and other matter from being drawn up the flexible tube 14. The apertures 11 in the sleeve 10 also serve to prevent sediment and other matter from entering the device.

As the level of fuel falls, the lower end of the float 15 moves out of the sleeve 10 as shown, thereby allowing fuel to be drawn to a level slightly below the sleeve 10.

In this manner, the volume of fuel in the tank can be maximised even if the sleeve 10 does not reach fully to the bottom of the tank.

There have been described and illustrated herein several embodiments of a float device and methods of operating same. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as claimed.

I claim:

1. A float device for use in drawing liquids from a tank or other reservoir, said device comprising:
   an elongate tubular member arranged to extend along a vertical direction within the tank;
   a unitary member arranged for rising and falling with the level of liquid in the tank, wherein said unitary member comprises a float chamber and a hollow chamber, said hollow chamber defined by at least one wall, at least a portion of said wall having a plurality of apertures for filtering liquid that is drawn into said hollow chamber; and
   a liquid pick-up duct which comprises a flexible tube having its free end coupled to said hollow chamber, said flexible tube for drawing filtered fluid from said hollow chamber;
   wherein said unitary member is arranged for movement along the vertical direction within said elongate tubular member; and
   wherein said elongate tubular member comprises an open lower end, and said unitary member has a configuration wherein a number of the apertures of said wall of said hollow chamber extend below said elongate tubular member when the level of liquid in the tank is low.

2. A float device according to claim 1, wherein:
said elongate tubular member has a tubular sidewall with a plurality of apertures disposed along its length.

3. A float device according to claim 1, wherein:
said float chamber and said hollow chamber share a common wall, said common wall being a bottom wall of said float chamber and a top wall of said hollow chamber.

4. A float device according to claim 1, wherein:
said float chamber has a tubular sidewall that extends upward from said hollow chamber.

5. A float device according to claim 4, further comprising:
wherein said connector extends upward adjacent the tubular sidewall of said float chamber.

6. A float device according to claim 1, wherein:
said at least one wall comprises a bottom wall of the hollow chamber, said plurality of apertures being formed in said bottom wall such that filtered liquid can be drawn through said bottom wall into said hollow chamber so that liquid can be drawn to a level below said elongate tubular member when the level of liquid in the tank is low.

7. A float device according to claim 1, wherein:
said at least one wall comprises an inclined wall of the hollow chamber, said plurality of apertures being formed in said inclined wall such that filtered liquid can be drawn through said inclined wall into said hollow chamber so that liquid can be drawn to a level below said elongate tubular member when the level of liquid in the tank is low.

8. The float device according to claim 1, wherein:
said portion of said wall having said plurality of apertures is on a sidewall of said hollow chamber, and
wherein some of said apertures of said sidewall are disposed below said elongate tubular member when the level of liquid in the tank is below said elongate tubular member.

9. The float device according to claim 1, wherein:
said portion of said wall having said plurality of apertures is below said free end of said flexible tube.

10. The float device according to claim 9, wherein:
said portion of said wall having said plurality of apertures is on a sidewall of said hollow chamber.

11. An apparatus comprising:
a tank or other reservoir for storing liquid;
an elongate tubular member extending along a vertical direction within the tank;
a unitary member arranged for rising and falling with the level of liquid in said tank, wherein said unitary member comprises a float chamber and a hollow chamber, said hollow chamber defined by at least one wall, at least a portion of said wall having a plurality of apertures for filtering liquid that is drawn into said hollow chamber; and
a liquid pick-up duct which comprises a flexible tube having its free end coupled to said hollow chamber, said flexible tube for drawing filtered fluid from said hollow chamber;
wherein said unitary member is arranged for movement along the vertical direction within said elongate tubular member; and
wherein said elongate tubular member comprises an open lower end, and said unitary member has a configuration wherein a number of the apertures of the portion of the at least one wall of said hollow chamber extends below said tubular member when the level of liquid in the tank is low.

12. An apparatus according to claim 11, wherein:
said elongate tubular member has a tubular sidewall with a plurality of apertures disposed along its length.

13. The float device according to claim 11, wherein:
said portion of said wall having said plurality of apertures is on a sidewall of said hollow chamber, and
wherein some of said apertures of said sidewall are disposed below said elongate tubular member when the level of liquid in the tank is below said elongate tubular member.

14. The float device according to claim 11, wherein:
said portion of said wall having said plurality of apertures is below the free end of said flexible tube.

15. The float device according to claim 14, wherein:
said portion of said wall having the plurality of apertures is on a sidewall of said hollow chamber.

16. A method of drawing liquids from a tank or other reservoir comprising:
providing an apparatus including a liquid pick-up duct operably coupled to a unitary member that is arranged to rise and fall within an elongate tubular member in accordance with the level of liquid in the tank, wherein the elongate tubular member is mounted in a vertical direction within the tank and surrounds the liquid pick-up duct, wherein the unitary member comprises a float chamber and a hollow chamber, the hollow chamber defined by at least one wall, at least a portion of said wall having a plurality of apertures for filtering liquid that is drawn into the hollow chamber, and wherein the liquid pick-up duct comprises a flexible tube having its free end coupled to the hollow chamber and the elongate tubular member has an open lower end; and
drawing liquid from the tank into the hollow chamber through the plurality of apertures of the at least one wall of the hollow chamber and then into to the liquid pick-up duct in order to filter liquid supplied by the apparatus via the liquid pick-up duct;
wherein, during the drawing of liquid from the tank into the hollow chamber, the unitary member has a configuration wherein a number of the apertures of the portion of the at least one wall of said hollow chamber extend below said tubular member when the level of liquid in the tank is low.

17. The float device according to claim 16, wherein:
said portion of said wall having said plurality of apertures is on a sidewall of said hollow chamber, and
wherein some of said apertures of said sidewall are disposed below said elongate tubular member when the level of liquid in the tank is below said elongate tubular member.

18. The float device according to claim 16, wherein:
said portion of said wall having said plurality of apertures is below the free end of said flexible tube.

19. The float device according to claim 18, wherein:
said portion of said wall having said plurality of apertures is on a sidewall of said hollow chamber.

\* \* \* \* \*